J. P. SCHREIBER.
ELECTRIC HEATER FOR POULTRY PLANTS.
APPLICATION FILED JULY 10, 1920.

1,388,974.

Patented Aug. 30, 1921.

Inventor
J. Philip Schreiber

By Lester L. Sargent
Attorney

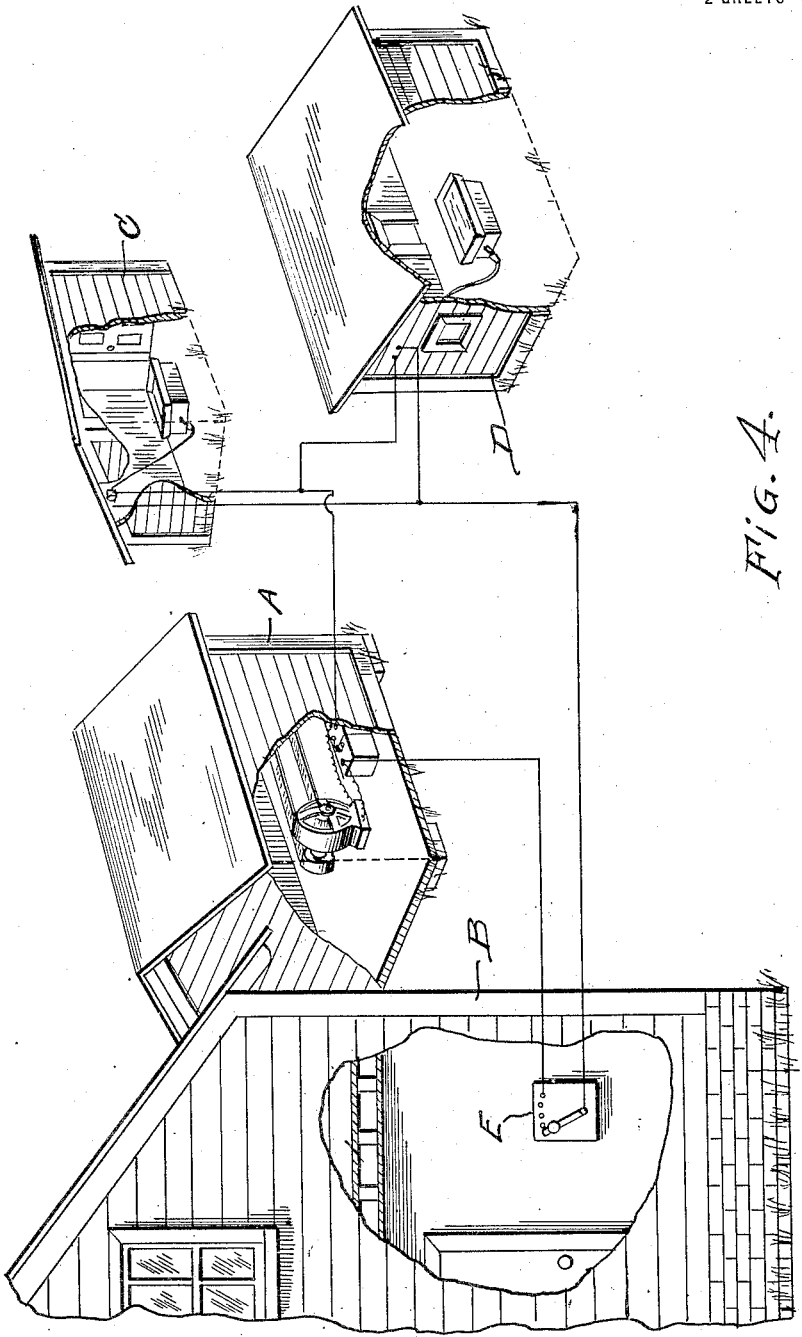

UNITED STATES PATENT OFFICE.

JOHN PHILIP SCHREIBER, OF MOUNT VERNON, INDIANA.

ELECTRIC HEATER FOR POULTRY PLANTS.

1,388,974.  Specification of Letters Patent.  Patented Aug. 30, 1921.

Application filed July 10, 1920. Serial No. 395,236.

*To all whom it may concern:*

Be it known that I, JOHN PHILIP SCHREIBER, a citizen of the United States, residing at Mount Vernon, in the county of Posey and State of Indiana, have invented a new and useful Electric Heater for Poultry Plants, of which the following is a specification.

The object of my invention is to provide a novel electric heater for poultry plants, adapted to utilize the ordinary incandescent bulb for heating purposes, and which is specially adapted for heating poultry fountains. It is also an object of my invention to provide means for regulating the amount of heat supplied so that the device may be regulated to suit changing weather conditions from a point at some distance from the poultry houses, as in a residence; and to provide a heater adapted for a variety of uses in hovers and poultry houses in winter when the temperature often runs below zero; and to provide means for conveniently detaching it from the current-supplying wires to permit of its being readily moved about when required. I attain these and other objects of my invention by the mechanism illustrated in the accompanying drawings, in which—

Fig. 4 is a diagrammatic view of the apparatus used in regulating my electric heater from a distant point.

Like numerals designate like parts in each of the several views.

Figure 1:
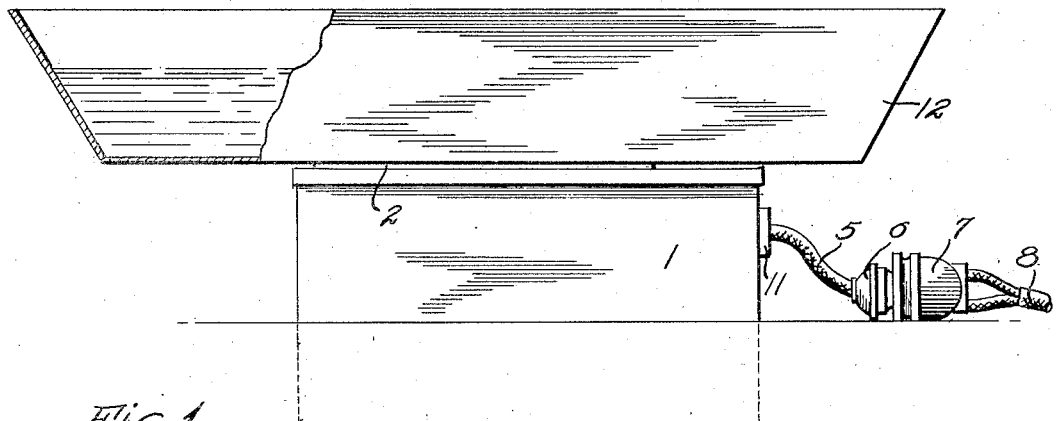
Figure 1 is a side elevation of the invention as used in heating a poultry fountain.
Figure 2:
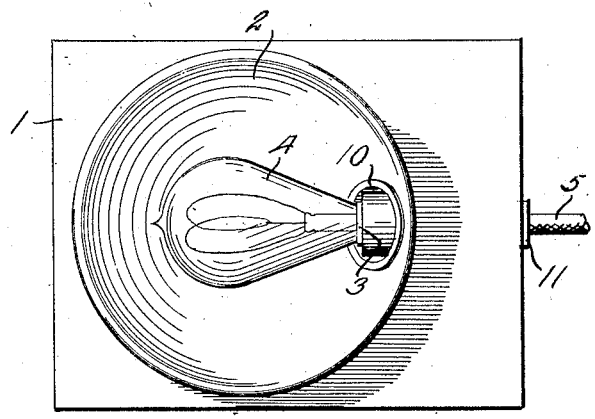
Fig. 2 is a top plan of the heater casing.
Figure 3:
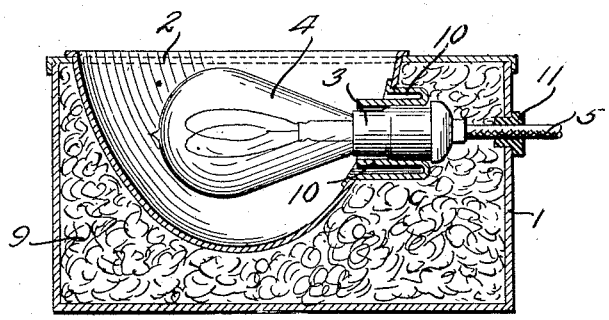
Fig. 3 is a longitudinal vertical section through the heater casing.

Referring to the accompanying drawings, I provide a rectangular metal casing 1, in which is mounted a suitable parabolic reflector 2 open at the top as illustrated adapted to concentrate the heat from an electric bulb 4, the screw plug 3 of which is detachably mounted in a socket 10 provided in the reflector 2 and positioned horizontally relative to the top and bottom of the casing 1. Bulb 4, as shown in Fig. 3, is positioned so that there is only a narrow space between it and the parabolic reflector 2 thus providing a much more efficient heating device than if the reflector were spaced farther from the bulb, with the result that a smaller amount of current is needed to give out the necessary heat for heating hovers, and preventing water in a poultry fountain from freezing. Attached to socket 10 is a suitable short electric connection 5 having a screw plug 6 attached to its free end, said screw plug 6 being detachably connected to a suitable socket 7 which is attached to the connecting wires 8 from any suitable source of electric current. A suitable insulation ring 11 is mounted in casing 1 to protect the electric connection 5 where it enters the casing. The casing 1 is filled with an asbestos packing 9 which is a non-heat-conducting material.

As illustrated in Fig. 4, I provide an electric current regulator or dimmer E, installed in a residence B and controlling the amount of current supplied from a lighting plant building A, to the poultry houses C and D, any number of such poultry houses being included in the circuit. The device E permits of convenient regulation of electric lamps in the poultry houses as well as regulation of the heaters; and also makes it possible to save a great deal of electric current in changeable weather.

To operate the device the plug 6 is attached to the socket 7 of the electric wires 8, and an electric bulb 4 is inserted in the socket 10 in the parabolic reflector 2, as shown in Fig. 3. A pan 12 of water is placed on the casing 1 over the reflector 2, which serves to concentrate the heat and to keep the water from freezing in the coldest weather. In changeable weather the amount of heat may be regulated from a distant point as from the residence of the operator of the poultry plant, by adjusting the dimmer E to control the amount of current supplied to the bulbs 4 in the heaters in the various poultry houses, all of which are supplied with these heaters connected to a single electric circuit and source of electric current. The apparatus is a great labor saver in operating fountains that are a long way from the residence of the poultry keeper, for it is merely necessary for him to observe his thermometer at his residence and regulate the heat supplied to the heaters by suitably adjusting the dimmer E to increase or decrease the electric current for the fountains. The heater is also adapted for general heating purposes in poultry houses, such as preventing the water in poultry fountains from freezing and heating hovers for chickens.

What I claim is:

In an electric heater heating means for poultry plants, the combination of a plurality of individual heaters disposed at separate positions, and each comprising a metal casing containing non-heat-conducting material, a parabolic reflector open at the top mounted in each of said casings, a socket mounted in each reflector, an incandescent bulb detachably mounted in each of said sockets and positioned close to the reflector wall, a short electric connection from each socket to a point exterior to the casing, a screw plug on the free end of each of said short connections, and a source of electric current, having a circuit detachably connectible with all of the various individual heating elements, and a current regulating device included in the circuit supplying electricity to the various individual heaters, and adapted to regulate the amount of current supplied to the various heaters from a central point at a considerable distance from the individual heating units.

JOHN PHILIP SCHREIBER.